United States Patent [19]

Klawitter

[11] Patent Number: 4,494,820

[45] Date of Patent: Jan. 22, 1985

[54] KALEIDOSCOPE ASSEMBLY

[75] Inventor: Ronald R. Klawitter, Hermann, Mo.

[73] Assignee: Handi-Pac, Inc., Hermann, Mo.

[21] Appl. No.: 462,058

[22] Filed: Jan. 28, 1983

[51] Int. Cl.³ .............................................. G02B 23/00
[52] U.S. Cl. .................................................... 350/4.1
[58] Field of Search ................................... 350/4.1, 4.2

[56] References Cited

U.S. PATENT DOCUMENTS

| | | | |
|---|---|---|---|
| 174,690 | 3/1876 | Macy | 350/4.2 |
| 2,762,257 | 9/1956 | Vacher | 350/4.2 X |
| 3,131,593 | 5/1964 | Grow | 350/4.1 |
| 3,255,661 | 6/1966 | Marban | 350/4.2 |
| 4,172,629 | 10/1979 | Allen | 350/4.1 |
| 4,231,634 | 11/1980 | Gantz et al. | 350/4.2 |

Primary Examiner—Richard A. Wintercorn
Attorney, Agent, or Firm—Polster, Polster and Lucchesi

[57] ABSTRACT

An improved kaleidoscope assembly having a small actuating member external of the housing to rotate the image producing head disposed within the housing and having improved image producing reflecting means.

7 Claims, 5 Drawing Figures

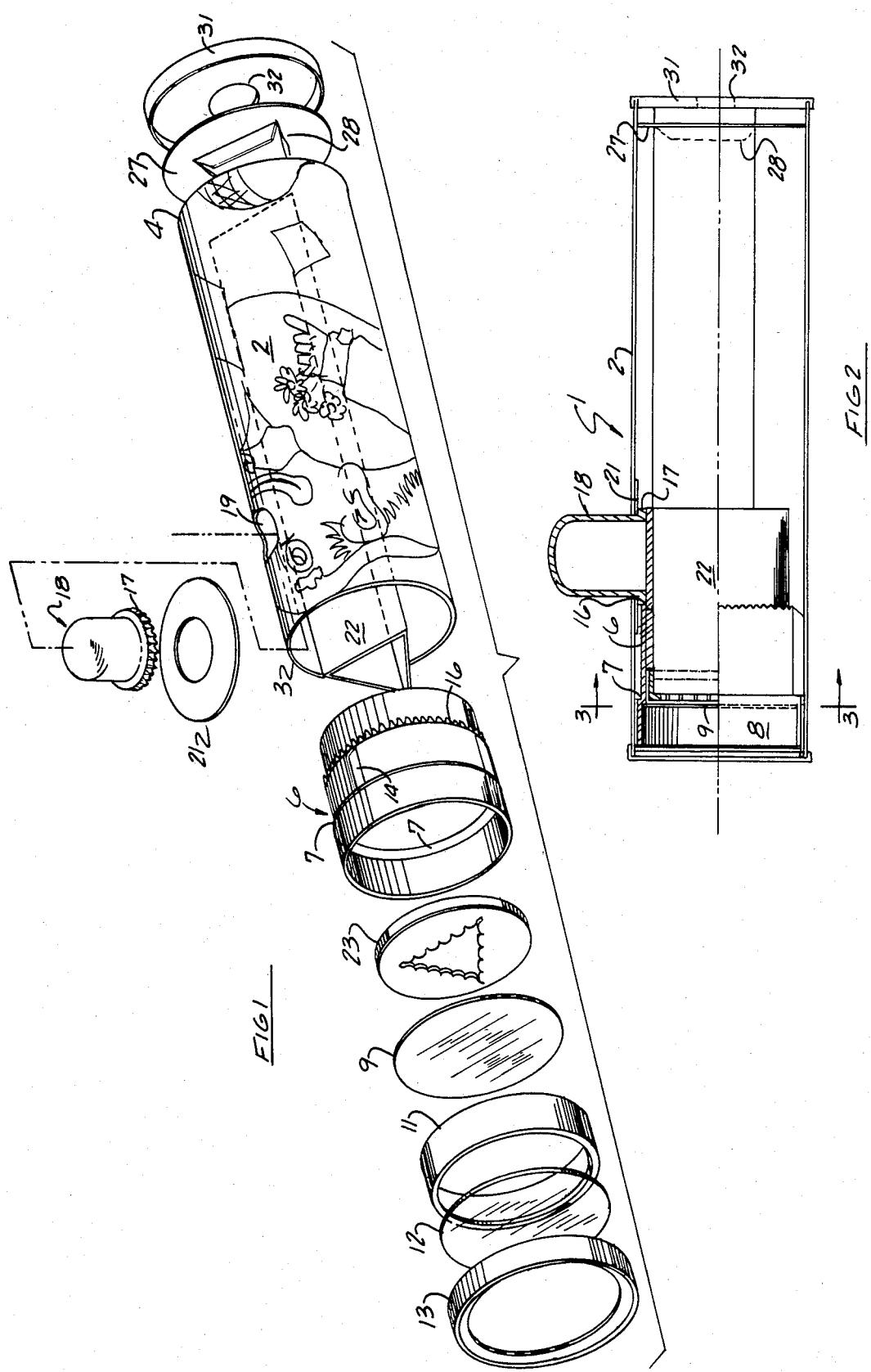

KALEIDOSCOPE ASSEMBLY

BACKGROUND OF THE INVENTION

The present invention relates to kaleidoscopes and more particularly to a novel kaleidoscope assembly.

Kaleidoscopes of various forms and embodiments are known in the art to include assemblies provided with a tubular body part having an eye piece at one end and a rotatable head at the other end. The body part has a V-shaped reflector mounted in it to extend between the eye piece end and the end opposite thereto. The reflector generally defines an opening adjacent the end opposite the eye piece, the field of vision observed through the eye piece being restricted along the reflector. At the end opposite the eye piece a transparent enclosure section containing a number of pattern producing objects or particles is provided. As the transparent enclosure is rotated as part of the rotatable head, which is conventionally hand-gripped for direct rotation through a large gripping ring projecting externally relative the body, the pattern producing objects tumble in front of the second opening with the real image observed there combining with the mirror images from the reflector to produce the well-known illusionary image at the eye piece.

Various attempts have been made to vary the conventional kaleidoscope assembly to facilitate its manufacture, to improve the image produced and to make the kaleidoscope physically more attractive to the user. For the most part these assemblies have been complex and expensive to manufacture and yet have not necessarily improved the produced image.

The present invention provides a kaleidoscope which is straightforward and inexpensive in construction, manufacture and assembly, which departs from the conventional direct, external hand rotation of the head by providing a small actuating member external of the body which can be actuated to move the head by the fingers of even a small child with a minimum of dexterity. In addition, the assembly of the present invention lends itself to incorporation as part of an overall image which can be made attractive to children of all ages and at the same time, the assembly provides an improved image at the eye piece with a minimum of parts.

Other features of the present invention will become apparent upon reading the disclosure set forth hereinafter.

BRIEF SUMMARY OF THE INVENTION

In accordance with this invention, generally stated, a kaleidoscope is provided, with a housing having a first end and a second end; a sleeve rotatably disposed within the housing adjacent the first end, the sleeve defining a transparent object enclosure therewithin; a plurality of pattern producing objects within the enclosure; an end wall having a view opening, the end wall being disposed adjacent the second end of the housing; reflecting means disposed within the housing to extend between the view opening and the transparent object enclosure to define a varying composite image at the view opening when the sleeve and transparent enclosure therein are rotated; support means within the housing to support the reflecting means; and manual actuating means projecting through the housing intermediate the first and second ends and cooperating with the sleeve to rotate the sleeve and the transparent object enclosure therewithin to produce the varying composite image at the viewing end by tumbling the pattern producing objects within the enclosure.

It is to be understood that various changes can be made by one skilled in the art in the construction, manufacture and assembly of the apparatus disclosed without departing from the scope or spirit of the present invention. For example instead of the novel knob arrangement taught by the present invention a rack and pinion drive could be utilized, the rack simulating other parts of the pictured image such as ears or arms. Further the scalloped aperture edge taught herein can be varied in geometric configuration to produce other images.

DRAWINGS

Referring to the drawings which disclose one advantageous embodiment of the present invention, FIG. 1 is an exploded isometric view of a kaleidoscope of this invention;

FIG. 2 is a partially broken away side view of the kaleidoscope of FIG. 1;

DETAILED DESCRIPTION

Figure 3:
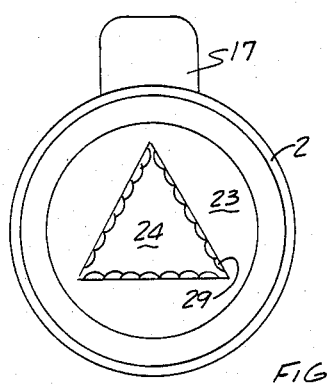
FIG. 3 is a cross-sectional view of the apparatus of FIG. 2, taken in a plane passing through line 3—3 of FIG. 2, looking toward the eye piece.

Referring to FIGS. 1 and 2 of the drawings, the inventive kaleidoscope assembly 1 includes a tubular housing 2 which can be made from any number of suitably stiff materials and advantageously is made from cardboard since it is inexpensive and lends itself to ready external printing and manufacture. Tubular housing or body 2 is provided, for purposes of description and orientation, with aligned first end 3 and second end 4. An annular, tubular sleeve 6, advantageously formed from a suitable plastic material, is arranged to be rotatably disposed within housing 2 adjacent first end 3. Sleeve 6 is formed to include an internal annular step or annular shoulder 7 adjacent end 3 of housing 2. This step or shoulder 7 serves to define one transverse extremity of transparent object enclosure 8 within sleeve 6. A transparent disc 9 made from suitable plastic material is provided to form one end wall of enclosure 8 within sleeve 6. One peripheral face of disc 9 facingly abuts against internal annular step 7. To hold disc 9 in this abutting position, an annular spacer member 11 is provided. This spacer member 11 is snugly disposed within sleeve 6 to extend axially along the length of transparent object enclosure 8 with one end face abutting the opposite peripheral face of the transparent disc 9 to seat disc 9 against step or shoulder 7 when the kaleidoscope is assembled.

A frosted translucent plastic disc 12 is provided to form the opposite end wall of transparent enclosure, with one peripheral face of disc 12 abutting the proximate end of spacer 11. An annular metal ring 13 grooved to fasten to the first end 3 of housing 2 by press fitting abuts against disc 12 and holds the same in position. Although not shown in the drawings, a plurality of pattern producing objects can be loosely disposed within transparent object enclosure 8 between discs 9 and 12, as is known in the art.

Referring to FIG. 2, it is to be noted that sleeve 6 can be formed with a plurality of spaced axially extending ribs 14. These ribs serve to provide guides or spacers and to strengthen the structure. A second step or shoulder is formed in sleeve 6 in the form of a ring gear 16 surrounding sleeve 6. The gear 16 is arranged to mesh with a spur gear 17 formed at the bottom of an actuating member in the form of a thumb knob 18. Knob 18 is arranged to project through aperture 19 formed in tubular housing 2. A suitable thin plastic washer 21 can be inserted in housing 2 between spur gear 17 and housing 2. It is to be noted that thumb knob 18 serves not only to impart rotational movement to sleeve 6 but also to provide a protruding simulated nose portion of a comic figure 35 portrayed on the outer face of the cardboard housing 2. This comic figure can be any one of several preselected characters besides a clown. For example, it can be a policeman, a bear, or a bunny. Moreover, it is within the realm of the present invention to provide a rack and pinion actuating assembly instead of the gear arrangement disclosed, the rack taking the form of ears, arms or legs of a figure portrayed on housing 2.

Referring again to FIGS. 1 and 2, an elongated metal reflecting member 22 of triangular cross-section is provided to extend within housing 2 between the transparent disc 9 of the transparent object enclosure 8 and the second end 4 of housing 2. A rimmed plastic guide and support disc 23 freely and transversely disposed within sleeve 6 adjacent transparent disc 9 serves to support one end of reflecting member 22. To accomplish this, as can be more fully observed in FIGS. 3 to 5 of the drawings, guide disc 23 is provided with an appropriately sized triangular aperture 24 with support edges 26 adjacent thereto to receive and support one end of reflecting member 22. As can be seen in FIGS. 1 and 2, a suitable second support disc 27 with support ledges 28 extending adjacent a properly sized triangular aperture in disc 27 can be provided within housing 2 to receive and support the other end of reflecting member 22. It is to be noted that disc 27 can be made from any one of a number of suitably stiff materials and, advantageously, can be made from cardboard.

Figure 4:
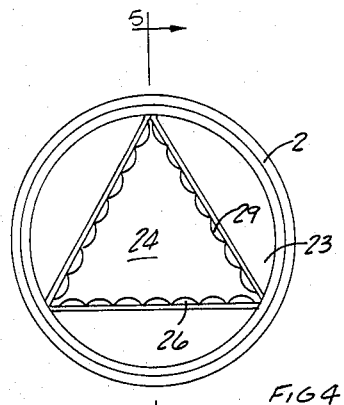
FIG. 4 is a cross-sectional view of the apparatus of FIG. 2 taken in a plane passing through line 4—4 of FIG. 2, looking away from the eye piece.
Figure 5:
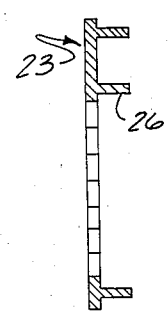
FIG. 5 is a cross-sectional view of FIG. 4 taken in a plane passing through line 5—5 of FIG. 4.

As can be seen in FIGS. 3-5, the triangular aperture 24 of disc 23 can be provided with a protruding geometric pattern along the edges thereof which, as disclosed, is in the form of scallops 29. These scalloped edges 29 serve to reflect as triangular images on the reflecting member 22. To close end 4 of tubular housing 2, a metallic end wall 31 having grooves for press fitting to end 4 is provided. End wall 31 is provided with a view opening 32 which is aligned with the longitudinal axis of the reflecting member 22 to permit the viewing of the varying images reflected on member 2.

From the description herein, it can readily be seen that a unique, attractive, straightforward, economical and efficiently assembled kaleidoscope arrangement is provided. Numerous variations in the construction of the kaleidoscope of this invention, within the scope of the appended claims, will become apparent to those skilled in the art in the light of the foregoing disclosure.

I claim:

1. A kaleidoscope comprising a hand supportable and operable housing having a first end and a second end; a sleeve rotatably disposed within said housing adjacent said first end, with the axis of rotation longitudinally extending toward said second end, said sleeve defining a transparent object enclosure therewithin; a plurality of pattern producing objects within said enclosure; an end wall having a view opening, said end wall being disposed adjacent said second end of said housing; reflecting means disposed within said housing to extend between said view opening and said transparent object enclosure to define a varying composite image at said view opening when said sleeve and said transparent enclosure therein are rotated; support means within said housing to support said reflecting means; and rotatable manual actuating means projecting through said housing intermediate said first and second ends in spaced relation from said ends with its axis of rotation extending normally to the axis of rotation of said sleeve and geared to said sleeve to rotate said sleeve and said transparent object enclosure therewithin to produce said varying composite image at said viewing end by tumbling said pattern producing objects within said enclosure.

2. The apparatus of claim 1, said actuating means having a spur gear fixed to one extremity thereof; said spur gear engaging within said housing to a ring gear fixed to and surrounding said sleeve to impart rotation to said sleeve when said actuating means is rotated.

3. The apparatus of claim 1, said housing and said sleeve being of tubular shape with said sleeve sized to snugly and rotatably fit within said housing, said sleeve including an annular internal step adjacent said first end of said housing; a transparent disc forming one end wall of said transparent enclosure within said sleeve, one peripheral face of said transparent disc facingly abutting against said internal step; an annular spacer ring snugly disposed within said sleeve to extend axially along the length of said transparent enclosure with one end face thereof abutting the opposite peripheral face of said transparent disc to seat said disc against said internal step; a translucent disc forming the opposite end wall of said transparent enclosure; and an annular ring disposed adjacent the first end of said housing to abut against said spacer ring and hold same in position.

4. The apparatus of claim 1, said reflecting means comprising an elongated reflective surface of triangular cross-section; said support means comprising spaced triangularly apertured support members sized to receive said triangular reflective surface, said support members extending transverse the longitudinal axis of said housing to support said reflective surface in aligned position between said view opening and said transparent object enclosure.

5. The apparatus of claim 4, at least one of said support members having a patterned aperture edge and positioned relative said triangular reflective surface to reflect patterned images thereon.

6. The apparatus of claim 1, said housing and said sleeve being of tubular shape with said sleeve sized to snugly and rotatably fit within said housing, said sleeve including an annular external step positioned adjacent said actuating means mounted on said housing and formed to provide a ring gear around said sleeve; said actuating means comprising a thumb knob having a gear fixed to one extremity thereof and engaging within said housing with said ring gear to impart rotational movement to said sleeve when said thumb knob is rotated.

7. A kaleidoscope comprising a cardboard tubular housing having an aligned first end and a second end; an annular, tubular plastic sleeve snugly and rotatably disposed within said housing adjacent said first end, said sleeve including an internal annular step adjacent said first end of said housing to define one extremity of a transparent object enclosure within said sleeve; a transparent disc forming one end wall of said transparent enclosure within said sleeve, one peripheral face of said transparent disc facingly abutting against said internal step; an annular cardboard spacer ring snugly disposed within said sleeve to extend axially along the length of said transparent enclosure with one end face thereof abutting the opposite peripheral face of said transparent disc to seat said disc against said internal step; a frosted translucent plastic disc forming the opposite end wall of said transparent enclosure; an annular metal ring fastened to the first end of said cardboard tubular housing to abut against said frosted disc and hold said disc in position; a plurality of pattern producing objects loosely disposed within said transparent object enclosure between said transparent and said translucent end walls; a plurality of spaced external rib members extending integral with and axially from said first step on said annular, tubular plastic sleeve to provide guide and strength ribs; a second annular external step formed in said sleeve intermediate the ends thereof to provide a ring gear around said sleeve; a thumb knob means extending through an aperture in said cardboard tubular housing to provide a protruding simulated nose portion of a comic figure portrayed on the outer face of said cardboard housing, the other end of said knob extending within said housing having a spur engaging said ring gear to impart rotational movement to said sleeve when said nose portion is turned to rotate; an elongated metal reflecting means of triangular cross-section extending within said housing between said transparent disc of said transparent object enclosure and said second end of said tubular cardboard housing; a rimmed plastic guide disc freely disposed within said sleeve adjacent said transparent disc, said guide disc having a scalloped, triangular aperture with support ledges extending normally adjacent the aperture edges to receive and support one end of said triangular reflective means, the scalloped edges reflecting as triangular images on said reflective means; a cardboard guide disc mounted adjacent the second end of said housing and having a triangular aperture therein with support ledges extending normally therefrom to receive and support the other end of said triangular reflective means; and a metallic end wall fastened to the second end of said cardboard housing and having a view opening aligned with the longitudinal axis of said elongated reflective means.

* * * * *